United States Patent
Rosaen et al.

(10) Patent No.: US 11,035,483 B2
(45) Date of Patent: *Jun. 15, 2021

(54) DUAL ORIFICE VENTURI VACUUM DRAWBACK ASSEMBLIES HAVING AIR BREATHER CHECK VALVE

(71) Applicant: Universal Flow Monitors, Inc., Hazel Park, MI (US)

(72) Inventors: Lars O. Rosaen, Plymouth, MI (US); Peter E. Hackett, Belleville, MI (US); Wesley Fowler, Redford, MI (US)

(73) Assignee: Universal Flow Monitors, Inc., Hazel Park, MI (US)

( * ) Notice: Subject to any disclaimer, the term of this patent is extended or adjusted under 35 U.S.C. 154(b) by 269 days.

This patent is subject to a terminal disclaimer.

(21) Appl. No.: 16/269,755

(22) Filed: Feb. 7, 2019

(65) Prior Publication Data

US 2019/0242486 A1 Aug. 8, 2019

Related U.S. Application Data

(60) Provisional application No. 62/627,488, filed on Feb. 7, 2018.

(51) Int. Cl.

| | |
|---|---|
| *F16K 11/00* | (2006.01) |
| *F16K 17/34* | (2006.01) |
| *F16K 37/00* | (2006.01) |
| *F16K 21/18* | (2006.01) |

(Continued)

(52) U.S. Cl.
CPC ............ *F16K 17/34* (2013.01); *B23K 37/003* (2013.01); *F04F 5/00* (2013.01); *F16K 21/185* (2013.01); *F16K 37/005* (2013.01)

(58) Field of Classification Search
CPC .... F16K 17/34; B60K 11/02; Y10T 137/2599
See application file for complete search history.

(56) References Cited

U.S. PATENT DOCUMENTS

| | | | |
|---|---|---|---|
| 1,085,348 A | * | 1/1914 | Ledoux .................. C02F 1/686 137/205.5 |
| 2,440,371 A | | 4/1948 | Holley, Jr. |
| 2,441,483 A | | 5/1948 | Goehring |

(Continued)

FOREIGN PATENT DOCUMENTS

| | | |
|---|---|---|
| CN | 201714511 U | 1/2011 |
| EP | 0961022 A2 | 12/1999 |

*Primary Examiner* — Reinaldo Sanchez-Medina
(74) *Attorney, Agent, or Firm* — Dinsmore & Shohl LLP (57) ABSTRACT

A dual orifice venturi vacuum drawback assembly includes a fluid supply passage that supplies fluid to the device, a fluid return passage that returns fluid from the device, a shutoff valve position on the fluid supply passage, a bypass passage, a bypass valve positioned on the bypass passage, and a dual orifice venturi valve. The bypass passage includes an inlet connected to the fluid supply passage upstream of the shutoff valve, and an outlet connected to the fluid return passage. The dual orifice venturi valve is positioned on the bypass passage upstream of the bypass valve. The dual orifice venturi valve includes a venturi inlet, a venturi outlet, a primary orifice, and a secondary orifice. The primary orifice is connected to a primary drawback opening on the fluid return passage. The secondary orifice is connected to a secondary drawback opening on the fluid return passage.

20 Claims, 4 Drawing Sheets

(51) Int. Cl.
  *F04F 5/00* (2006.01)
  *B23K 37/00* (2006.01)

(56) References Cited

U.S. PATENT DOCUMENTS

| | | |
|---|---|---|
| 2,639,084 A | 5/1953 | Mackenzie |
| 2,746,250 A | 5/1956 | Hawkins |
| 2,953,147 A | 9/1960 | Hornback |
| 3,276,468 A | 10/1966 | Lebow |
| 3,370,423 A | 2/1968 | Vaughan |
| 3,460,566 A | 8/1969 | Heartstedt et al. |
| 3,481,274 A | 12/1969 | Napolitano |
| 3,924,713 A | 12/1975 | Bessiere |
| 3,946,562 A | 3/1976 | Ross |
| 4,116,577 A | 9/1978 | Lauck |
| 4,383,646 A | 5/1983 | Smith |
| 4,637,351 A | 1/1987 | Pakula |
| 4,711,268 A | 12/1987 | Coleman |
| 4,744,730 A | 5/1988 | Roeder |
| 4,879,912 A | 11/1989 | Suckow |
| 5,032,059 A | 7/1991 | McCall et al. |
| 5,080,560 A | 1/1992 | LeRoy et al. |
| 5,556,259 A | 9/1996 | Hilavenka |
| 5,586,449 A | 12/1996 | Krist |
| 5,647,221 A | 7/1997 | Garris, Jr. |
| 5,762,100 A | 6/1998 | Wilda et al. |
| 5,775,361 A | 7/1998 | Phillips |
| 5,983,869 A | 11/1999 | Cooke et al. |
| 6,063,269 A | 5/2000 | Miller et al. |
| 6,357,477 B1 | 3/2002 | Walcott et al. |
| 6,701,953 B2 | 3/2004 | Agosta |
| 6,932,902 B2 | 8/2005 | Hirasawa et al. |
| 7,044,158 B1 | 5/2006 | Huff et al. |
| 8,656,698 B1 | 2/2014 | Jansen et al. |
| 9,297,341 B2 | 3/2016 | VanDerWege |
| 9,645,068 B2 | 5/2017 | Zhang |
| 10,641,406 B2 * | 5/2020 | Rosaen ................ F16K 37/005 |
| 2004/0079411 A1 | 4/2004 | Davis |
| 2006/0140780 A1 | 6/2006 | Stark |
| 2010/0266424 A1 | 10/2010 | Renz et al. |
| 2012/0167997 A1 | 7/2012 | Brensing et al. |
| 2015/0354600 A1 | 12/2015 | Fletcher et al. |
| 2016/0025117 A1 | 1/2016 | Engelhard et al. |

* cited by examiner

DUAL ORIFICE VENTURI VACUUM DRAWBACK ASSEMBLIES HAVING AIR BREATHER CHECK VALVE

CROSS-REFERENCE TO RELATED APPLICATIONS

This application claims priority to U.S. Provisional Patent Application Ser. No. 62/627,488 filed Feb. 7, 2018, the entire contents of which are incorporated herein by reference.

TECHNICAL FIELD

The present disclosure is directed to a dual orifice venturi vacuum drawback assemblies for controlling the flow of a fluid, more particularly, dual orifice venturi vacuum drawback assemblies that include a bypass passage that creates a drawback vacuum using a dual orifice venturi valve and an air breather check valve that introduces air into the assembly to facilitate the draining of the fluid.

BACKGROUND

Previously known coolant delivery systems include a coolant supply passage and a coolant return passage. The coolant supply passage runs from a supply of coolant to a device to be cooled. The coolant return passage runs from the device to be cooled to a coolant recirculating device. The coolant recirculating device removes the heat added to the coolant by the device to be cooled and then recirculates the coolant to the coolant supply.

In addition, the previously known coolant delivery systems are configured to close the coolant supply passage upon the detection of a leak or upon performance of maintenance. However, any coolant that remains in the coolant supply passage downstream from the closure will continue to discharge from the leak or from an opening due to maintenance. The continuous discharge of coolant even after the closure of the coolant supply passage increases the stop work delay due to the cleaning of the discharged coolant.

Accordingly, a need exists for alternative systems and methods for draining coolant that remains in a coolant delivery system downstream from a closure after leak detection or during maintenance.

SUMMARY

In one embodiment, a dual orifice venturi vacuum drawback assembly for controlling a flow of a fluid from a device, includes a fluid supply passage, a fluid return passage, a bypass passage, a bypass valve, and a dual orifice venturi valve. The fluid supply passage supplies the fluid to the device. The fluid return passage returns the fluid from the device. The shutoff valve is positioned on the fluid supply passage. The bypass passage includes an inlet and an outlet. The inlet is connected to the fluid supply passage upstream of the shutoff valve. The outlet is connected to the fluid return passage. The bypass valve is positioned on the bypass passage. The dual orifice venturi valve is positioned on the bypass passage upstream of the bypass valve. The dual orifice venturi valve includes a venturi inlet, a venturi outlet, a primary orifice, and a secondary orifice. The primary orifice is connected to a primary drawback opening on the fluid return passage by a primary conduit. The secondary orifice is connected to a secondary drawback opening on the fluid return passage by a secondary conduit.

In another embodiment, a dual orifice venturi vacuum drawback assembly for controlling a flow of a fluid from a device, includes a fluid supply passage, a fluid return passage, a bypass passage, a bypass valve, and a dual orifice venturi valve. The fluid supply passage connects to a primary fluid supply branch and a secondary fluid supply branch. The primary fluid supply branch supplies from the fluid supply passage to the fluid to the primary device. The secondary fluid supply branch supplies fluid from the fluid supply passage to the secondary device. The fluid return passage connects to a primary fluid return branch and a secondary fluid return branch. The primary fluid return branch returns fluid from the primary device to the fluid return passage. The secondary fluid return branch returns fluid from the secondary device to the fluid return passage. The shutoff valve is positioned on the fluid supply passage upstream of the primary fluid supply branch and the secondary fluid supply branch. The bypass passage includes an inlet and an outlet. The inlet is connected to the fluid supply passage upstream of the shutoff valve. The outlet is connected to the fluid return passage downstream of the primary fluid return branch and the secondary fluid return branch. The bypass valve is positioned on the bypass passage. The dual orifice venturi valve is positioned on the bypass passage upstream of the bypass valve. The dual orifice venturi valve includes a venturi inlet, a venturi outlet, a primary orifice, and a secondary orifice. The primary orifice is connected to a primary drawback opening on the primary fluid return branch by a primary conduit. The secondary orifice is connected to a secondary drawback opening on the primary fluid return branch by a secondary conduit.

In another embodiment, a dual orifice venturi vacuum drawback assembly for controlling a flow of a fluid from a device, includes a fluid supply passage, a fluid return passage, a primary air breather check valve, a secondary air breather check valve, bypass passage, a bypass valve, and a dual orifice venturi valve. The fluid supply passage connects to a primary fluid supply branch and a secondary fluid supply branch. The primary fluid supply branch supplies from the fluid supply passage to the fluid to the primary device. The secondary fluid supply branch supplies fluid from the fluid supply passage to the secondary device. The fluid return passage connects to a primary fluid return branch and a secondary fluid return branch. The primary fluid return branch returns fluid from the primary device to the fluid return passage. The secondary fluid return branch returns fluid from the secondary device to the fluid return passage. The shutoff valve is positioned on the fluid supply passage upstream of the primary fluid supply branch and the secondary fluid supply branch. The primary air breather check valve is position on the primary fluid supply branch downstream of the shutoff valve. The secondary air breather check valve is position on the secondary fluid supply branch downstream of the shutoff valve. The bypass passage includes an inlet and an outlet. The inlet is connected to the fluid supply passage upstream of the shutoff valve. The outlet is connected to the fluid return passage downstream of the primary fluid return branch and the secondary fluid return branch. The bypass valve is positioned on the bypass passage. The dual orifice venturi valve is positioned on the bypass passage upstream of the bypass valve. The dual orifice venturi valve includes a venturi inlet, a venturi outlet, a primary orifice, and a secondary orifice. The primary orifice is connected to a primary drawback opening on the primary fluid return branch by a primary conduit. The secondary orifice is connected to a secondary drawback opening on the secondary fluid return branch by a secondary conduit.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

In some embodiments of the present disclosure, the dual orifice venturi vacuum drawback assembly includes a fluid supply passage, a fluid return passage, a bypass passage, a bypass valve, and a dual orifice venturi valve. The fluid supply passage supplies the fluid to a device. The fluid return passage returns the fluid from the device. The shutoff valve is positioned on the fluid supply passage. The bypass passage includes an inlet and an outlet. The inlet is connected to the fluid supply passage upstream of the shutoff valve. The outlet is connected to the fluid return passage. The bypass valve is positioned on the bypass passage. The dual orifice venturi valve is positioned on the bypass passage upstream of the bypass valve. The dual orifice venturi valve includes a venturi inlet, a venturi outlet, a primary orifice, and a secondary orifice. The primary orifice is connected to a primary drawback opening on the fluid return passage by a primary conduit. The secondary orifice is connected to a secondary drawback opening on the fluid return passage by a secondary conduit.

In some embodiments, the dual orifice venturi vacuum drawback assemblies includes an air breather check valve positioned on the fluid supply passage upstream of the device. Upon movement of the shutoff valve from a normally open position to a closed position and movement of the bypass valve from a normally closed position to an open position, fluid is inhibited from flowing through the shutoff valve to the device. Fluid is permitted to flow through the bypass passage including the dual orifice venturi valve. The flow of fluid through the dual orifice venturi valve creates a vacuum at the primary orifice and the secondary orifice which draws back fluid contained in the fluid return passage downstream of the device. The fluid in the fluid return passage downstream of the device is drawn through the primary conduit into the primary orifice of the dual orifice venturi valve of the bypass passage so as to exit the bypass passage and into the fluid return passage.

The creation of the vacuum at the primary orifice and the secondary orifice of the dual orifice venturi valve draws fluid in the fluid return passage through the device and the fluid supply passage. The draw of fluid in the fluid supply passage creates a vacuum in the fluid supply passage which moves the air breather check valve from a normally closed position to an open position to permit air from atmosphere to enter the fluid supply passage to facilitate the drawback of fluid in the fluid supply passage, the device, and the fluid return passage.

Figure 1:
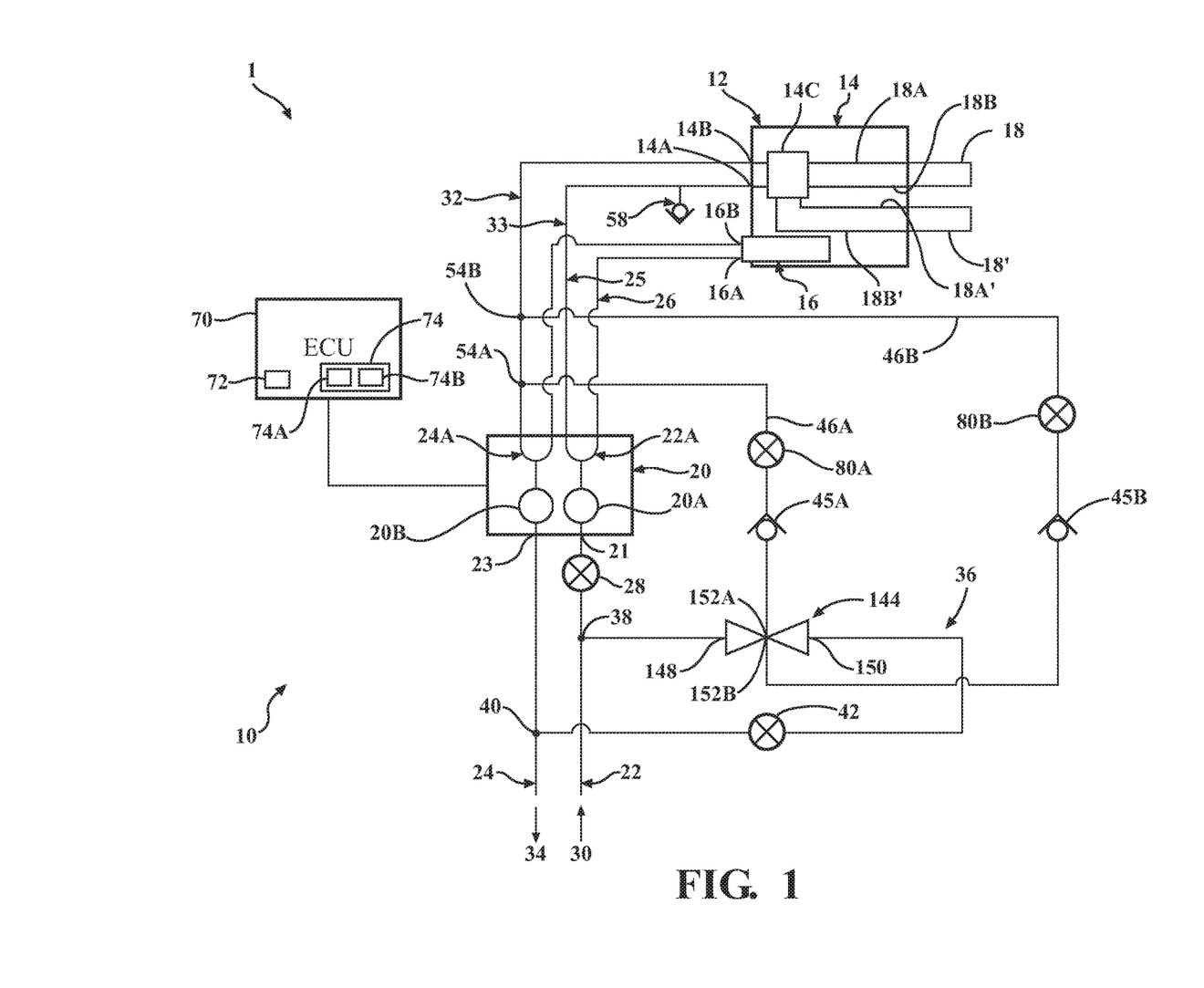
FIG. 1 schematically depicts a dual orifice venturi vacuum drawback assembly for controlling a flow of a fluid from a device, according to one or more embodiments shown and described herein.

Referring to FIG. 1, a coolant delivery system is generally illustrated at 1. The coolant delivery system 1 includes a dual orifice venturi vacuum drawback assembly 10. The coolant delivery system 1 includes a device 12 to be cooled by a fluid, for example a coolant. In some embodiments, the device 12 includes a primary device 14 and a secondary device 16. In some embodiments, the primary device 14 is a robotic welding device that includes an upper weld tip 18 and a lower weld tip 18'. In some embodiments, the secondary device 16 is a transformer. The primary device 14 includes a primary device inlet 14A and a primary device outlet 14B. The secondary device 16 includes a secondary device inlet 16A and a secondary device outlet 16B.

The dual orifice venturi vacuum drawback assembly 10 includes a fluid supply 30, a fluid supply passage 22, a fluid return 34, and a fluid return passage 24. In some embodiments, the fluid return 34 includes a coolant recirculating device (not shown). The coolant recirculating device, such as refrigerator, removes the heat added to the coolant by the device 12 to be cooled, and then recirculates the coolant to the fluid supply 30.

The fluid supply passage 22 connects to a primary fluid supply branch 25 and a secondary fluid supply branch 26. The fluid return passage 24 connects to a primary fluid return branch 32 and a secondary fluid return branch 33. The fluid supply passage 22 includes a fluid supply branch portion 22A that connects the fluid supply passage 22 to the primary fluid supply branch 25 and the secondary fluid supply branch 26. The fluid return passage 24 includes a fluid return branch portion 24A that connects the fluid return passage 24 to the primary fluid return branch 32 and the secondary fluid return branch 33.

The primary fluid supply branch 25 extends from the fluid supply branch portion 22A to the primary device inlet 14A. The secondary fluid supply branch 26 extends from the fluid supply branch portion 22A to the secondary device inlet 16A. The primary fluid return branch 32 extends from the primary device outlet 14B to the fluid return branch portion 24A. The secondary fluid return branch 33 extends from the secondary device outlet 16B to the fluid return branch portion 24A.

The primary device 14 may include a junction 14C that includes the primary device inlet 14A and the primary device outlet 14B. The upper weld tip 18 is connected to the junction 14C by an upper weld tip fluid supply passage 18A and an upper weld tip fluid return passage 18B. The lower weld tip 18' is connected to the junction 14C by a lower weld tip fluid supply passage 18A' and a lower weld tip fluid return passage 18B'. The upper weld tip 18 fluidly connects the upper weld tip fluid supply passage 18A to the upper weld tip fluid return passage 18B. The lower weld tip 18' fluidly connects the lower weld tip fluid supply passage 18A' to the lower weld tip fluid return passage 18B'. Fluid is supplied to the upper weld tip 18 from the junction 14C by the upper weld tip fluid supply passage 18A and fluid is returned to the junction 14C from the upper weld tip 18 by the upper weld tip fluid return passage 18B. Fluid is supplied to the lower weld tip 18' from the junction 14C by the lower weld tip fluid supply passage 18A' and fluid is returned to the junction 14C from the lower weld tip 18' by the lower weld tip fluid return passage 18B'.

The junction 14C may be provided as a splitter that splits the fluid flowing into the primary device 14 from the primary device inlet 14A into the upper weld tip fluid supply passage 18A and the lower weld tip fluid supply passage 18A' and that rejoins the fluid flowing from the upper weld tip fluid return passage 18B and the lower weld tip fluid return passage 18B' into the primary device outlet 14B. Specifically, the junction 14C connects the primary device inlet 14A to the upper weld tip fluid supply passage 18A and the lower weld tip fluid supply passage 18A', and connects the upper weld tip fluid return passage 18B and the lower weld tip fluid return passage 18B' to the primary device outlet 14B.

As such, fluid entering the primary device 14 at the primary device inlet 14A is split by the junction 14C into the upper weld tip fluid supply passage 18A and the lower weld tip fluid supply passage 18B. The fluid flows through the upper weld tip fluid supply passage 18A to the upper weld tip 18 to cool the upper weld tip 18, and into the upper weld tip fluid return passage 18B. The fluid flows through the lower weld tip fluid supply passage 18A' to the lower weld tip 18' to cool the lower weld tip 18', and into the lower weld tip fluid return passage 18B'. The fluid in the upper weld tip fluid return passage 18B and the fluid in the lower weld tip fluid return passage 18B' rejoins at the junction 14C and exits the primary device 14 at the primary device outlet 14B.

As discussed above, the fluid enters the primary device 14 through the primary device inlet 14A to cool the primary device 14 and the fluid, heated by the primary device 14, exits through the primary device outlet 14B, and the fluid enters the secondary device 16 through the secondary device inlet 16A to cool the secondary device 16 and the fluid, heated by the secondary device 16, exits through the secondary device outlet 16B.

In some embodiments, the junction 14C is provided a component of the primary device 14. In some other embodiments, the junction 14C is provided as a separate component from the primary device 14.

The venturi vacuum drawback assembly 10 may also include a flowmeter unit 20 that is provided on at least one of the fluid supply passage 22 and the fluid return passage 24. The flowmeter unit 20 includes a supply inlet 21 on the fluid supply passage 22 and a return outlet 23 on the fluid return passage 24. The supply inlet 21 is provided upstream of the fluid supply branch portion 22A and connects the fluid supply passage 22 to the flowmeter unit 20. The return outlet 23 is provided downstream of the fluid return branch portion 24A and connects the fluid return passage 24 to the flowmeter unit 20. As described in greater detail below, the flowmeter unit 20 detects leaks from cap loss, hose burst, scheduled and/or inadvertent shutoff and outputs a leak signal upon the detection of a leak.

The venturi vacuum drawback assembly 10 may also include a shutoff valve 28 that is positioned on the fluid supply passage 22 upstream of the flowmeter unit 20. Specifically, the shutoff valve 28 is provided on the fluid supply passage 22 upstream of the supply inlet 21. The shutoff valve 28 is switchable between a normally open position and a closed position. In the open position, the shutoff valve 28 allows coolant from the fluid supply 30 to flow into the supply inlet 21. In the closed position, the shutoff valve 28 inhibits fluid flowing from the fluid supply 30 through the shutoff valve 28 to the supply inlet 21.

The venturi vacuum drawback assembly 10 also includes a bypass passage 36, a bypass valve 42, a dual orifice venturi valve 144, a primary conduit 46A, and a secondary conduit 46B. The bypass passage 36 includes a bypass inlet 38 and a bypass outlet 40. The bypass inlet 38 is positioned on the fluid supply passage 22 upstream of the shutoff valve 28. The bypass outlet 40 is positioned on the fluid return passage 24 downstream of the return outlet 23.

The bypass valve 42 is switchable between a normally closed position and an open position. In the closed position, the bypass valve 42 inhibits fluid from passing through the bypass passage 36. In the open position, the bypass valve 42 allows fluid to flow through the bypass passage 36 to bypass the device 12. Specifically, the fluid that flows through the bypass passage 36 bypasses the supply inlet 21, the flowmeter unit 20, the primary fluid supply branch 25, the primary device inlet 14A, the primary device 14, the primary device outlet 14B, the primary fluid return branch 32, the flowmeter unit 20, and the return outlet 23 so as to enter the fluid return passage 24 downstream of the return outlet 23. Similarly, the fluid that flows through the bypass passage 36 bypasses the supply inlet 21, the flowmeter unit 20, the secondary fluid supply branch 26, the secondary device inlet 16A, the secondary device 16, the secondary device outlet 16B, the secondary fluid return branch 33, the flowmeter unit 20, and the return outlet 23 so as to enter the fluid return passage 24 downstream of the return outlet 23.

The dual orifice venturi valve 144 is positioned on the bypass passage 36 between the bypass inlet 38 and the bypass valve 42. The dual orifice venturi valve 144 includes a venturi inlet 148, a venturi outlet 150, a primary orifice 152A, and a secondary orifice 152B. The primary orifice 152A and the secondary orifice 152B are positioned between the venturi inlet 148 and the venturi outlet 150. The primary orifice 152A is connected to a primary drawback opening 54A by the primary conduit 46A and the secondary orifice 152B is connected to a secondary drawback opening 54B by the secondary conduit 46B.

The primary drawback opening 54A is provided on the primary fluid return branch 32 downstream of the primary device outlet 14B and upstream of the flowmeter unit 20, specifically, upstream of the fluid return branch portion 24A. The primary conduit 46A connects the primary orifice 152A to the primary drawback opening 54A. The secondary drawback opening 54B is provided on the primary fluid return branch 32 downstream of the primary device outlet 14B and upstream of the flowmeter unit 20, specifically, upstream of the fluid return branch portion 24A. The secondary conduit 46B connects the secondary orifice 152B to the secondary drawback opening 54B.

In some embodiments, a check valve 45A is positioned on the primary conduit 46A between the primary orifice 152A and the primary drawback opening 54A and a check valve 45B is positioned on the secondary conduit 46B between the secondary orifice 152B and the secondary drawback opening 54B.

In some embodiments, the venturi vacuum drawback assembly 10 includes a primary conduit valve 80A and a secondary conduit valve 80B. The primary conduit valve 80A is positioned on the primary conduit 46A between the primary drawback opening 54A and the primary orifice 152A. The primary conduit valve 80A is movable between a normally closed position, which prevents the flow of fluid through the primary conduit valve 80A, and an open position, which permits the flow of fluid through the primary conduit valve 80A. The secondary conduit valve 80B is positioned on the secondary conduit 46B between the secondary drawback opening 54B and the secondary orifice 152B. The secondary conduit valve 80B is movable between a normally closed position, which prevents the flow of fluid through the secondary conduit valve 80B, and an open position, which permits the flow of fluid through the secondary conduit valve 80B.

In normal operation, in which the presence of a leak is not detected and/or the dual orifice venturi vacuum drawback assembly 10 is not undergoing maintenance, the check valve 45A prevents fluid flowing through the bypass inlet 38, the primary orifice 152A, and the primary conduit 46A from entering the primary drawback opening 54A. Similarly, in normal operation, in which the presence of the leak is not detected and/or the dual orifice venturi vacuum drawback assembly 10 is not undergoing maintenance, the check valve 45B prevents fluid flowing through the bypass inlet 38, the secondary orifice 152B, and the secondary conduit 46B from entering the secondary drawback opening 54B The flowmeter unit 20 is configured to detect differences in flow between the fluid flowing through the fluid supply passage 22 and the fluid return passage 24. Specifically, a supply flowmeter 20A is provided between the supply inlet 21 and the fluid supply branch portion 22A and a return flowmeter 20B is provided between the fluid return branch portion 24A and the return outlet 23. The flowmeter unit 20 includes an electronic control unit 70.

Examples of a flowmeter unit 20 that may be used in the disclosed venturi vacuum drawback assembly 110 include, but are not limited to, the Delta Point®, Ethernet Delta Point®, 24V DC Delta Point®, 120V AC Delta Point®, and DeviceNet Delta Point®, sold by Rocon LLC of Hazel Park, Mich. It will be appreciated, of course, that other flowmeter units may also be used in conjunction with the dual orifice venturi vacuum drawback assembly 10.

The electronic control unit 70 is electronically connected to the shutoff valve 28, the bypass valve 42, the primary conduit valve 80A, and the secondary conduit valve 80B. Specifically, the electronic control unit 70 is configured to control the operation of the shutoff valve 28 between the normally open position and the closed position. The electronic control unit 70 is further configured to control the operation of the bypass valve 42 between the normally closed position and the open position. The electronic control unit 70 is further configured to control the operation of primary conduit valve 80A and the secondary conduit valve 80B between the normally closed position and the open position. In some embodiments, the shutoff valve 28, the bypass valve 42, the primary conduit valve 80A, and the secondary conduit valve 80B are electronically controlled solenoid valves that are controlled by the electronic control unit 70.

In some embodiments, the electronic control unit 70 includes a processor 72 and a memory component 74 coupled to the processor 72. The processor 72 is a central processing unit (CPU). The processor 72 includes processing components operable to receive and execute instructions from the memory component 74. The memory component 74 stores detection logic 74A and control logic 74B. The detection logic 74A and the control logic 74B may each include a plurality of different pieces of logic, each of which may be embodied as a computer program, firmware, and/or software/hardware.

In some embodiments, the memory component 74 is configured as volatile and/or nonvolatile memory and as such may include random access memory (SRAM, DRAM, and/or other types of RAM), flash memory, secure digital (SD) memory, registers, compact discs, digital versatile discs (DVD), and/or other types of nontransitory computer readable mediums. Depending on the particular embodiments, these nontransitory computer readable mediums may reside within the electronic control unit 70 and/or external to the electronic control unit 70 and the flowmeter unit 20.

The detection logic 74A is executable by the processor 72 to detect one or more signals output from the supply flowmeter 20A and the return flowmeter 20B. For example, the detection logic 74A is configured to cause the processor 72 to determine a presence or absence of a leak in the coolant delivery system 1, specifically, a leak in at least one of the fluid supply passage 22, the primary device 14, including primary device inlet 14A and the primary device outlet 14B, the secondary device 16, including secondary device inlet 16A and secondary device outlet 16B, the primary fluid supply branch 25, the secondary fluid supply branch 26, the primary fluid return branch 32, the secondary fluid return branch 33, and the fluid return passage 24 based on the signals output from at least one of the supply flowmeter 20A and the return flowmeter 20B. Specifically, processor 72 determines the presence or absence of the leak based on output signals from the supply flowmeter 20A and the return flowmeter 20B that indicate the flowrates of the fluid supply passage 22 and the fluid return passage 24, respectively.

The control logic 74B is executed by the processor 72 to control operation of the shutoff valve 28, the bypass valve 42, the primary conduit valve 80A, and the secondary conduit valve 80B based on the determination of the presence or absence of a leak in the coolant delivery system 1 by the processor 72. In some embodiments, when the processor 72 has determined the absence of a leak, the control logic 74B is executed by the processor 72 to control the shutoff valve 28 into the normally open position, control the bypass valve 42 in the normally closed position, and control the primary conduit valve 80A, and the secondary conduit valve 80B in the normally closed position.

The dual orifice venturi vacuum drawback assembly 10 may also include an air breather check valve 58 position on the primary fluid supply branch 25 upstream of the primary device inlet 14A. Specifically, the air breather check valve 58 is positioned on the primary fluid supply branch 25 between the primary device inlet 14A and the fluid supply branch portion 22A. The air breather check valve 58 has one end attached to the primary fluid supply branch 25 and an opposite end open to atmosphere. In some embodiments, the air breather check valve 58 is positioned upstream from the junction 14C.

As will be described in greater detail below, the air breather check valve 58 is in a normally closed position during normal operation, that is when the flowmeter unit 20 detects the absence of the leak such that the bypass valve 42 is in the normally closed position, the shutoff valve 28 is in the normally open position, and the primary conduit valve 80A and the secondary conduit valve 80B are in the normally closed position. In the normally closed position, the air breather check valve 58 inhibits the ingress of air from atmosphere from entering the primary fluid supply branch 25. Specifically, the flow of fluid within the primary fluid supply branch 25 pressurizes the air breather check valve 58 to maintain the air breather check valve 58 in the normally closed position. In some embodiments, the presence of fluid within the primary fluid supply branch 25 pressurizes the air breather check valve 58 to maintain the air breather check valve 58 in the normally closed position. In some other embodiments, the air breather check valve 58 is an electronically controlled solenoid valve electronically controlled by the electronic control unit 70.

In some embodiments, the air breather check valve 58 is only provided on the primary fluid supply branch 25 that connects the fluid supply passage 22 to the primary device inlet 14A. In some other embodiments, the air breather check valve 58 is not provided on the secondary fluid supply branch 26 which connects the fluid supply passage 22 to the secondary device inlet 16A.

Figure 2A:
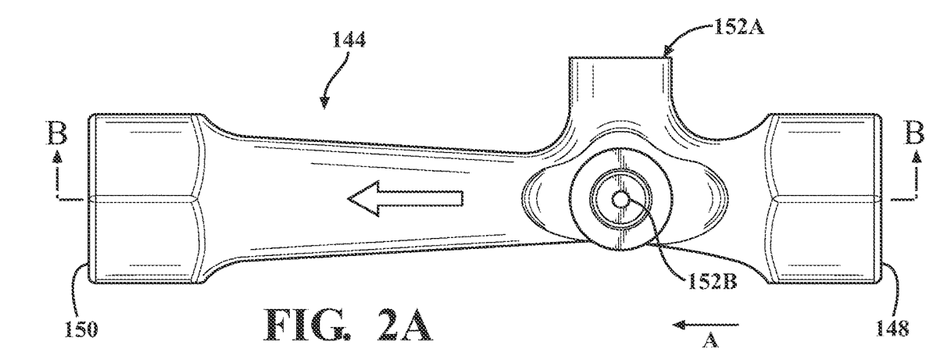
FIG. 2A schematically depicts a partial side view of a dual orifice venturi valve of the dual orifice venturi vacuum drawback assemblies of FIG. 1, according to one or more embodiments shown and described herein FIG. 2B schematically depicts a partial cross-sectional view of the dual orifice venturi valve of the dual orifice venturi vacuum drawback assembly taken along the lines B-B of FIG. 2A, according to one or more embodiments shown and described herein.
Figure 2B:
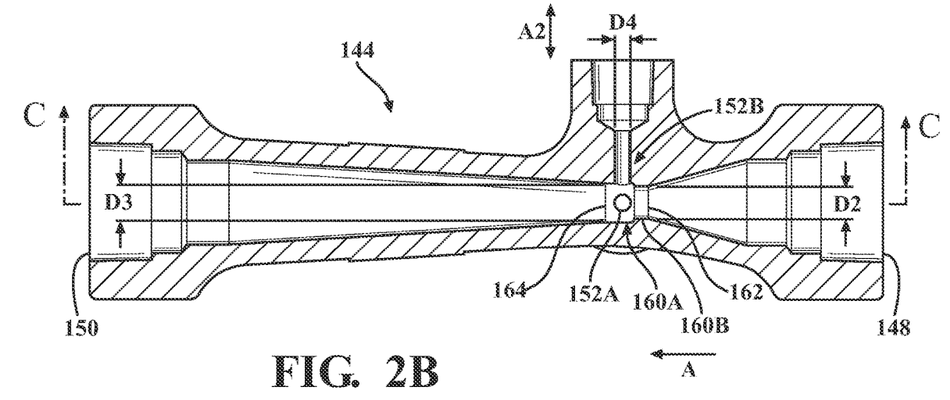
Figure 2C:
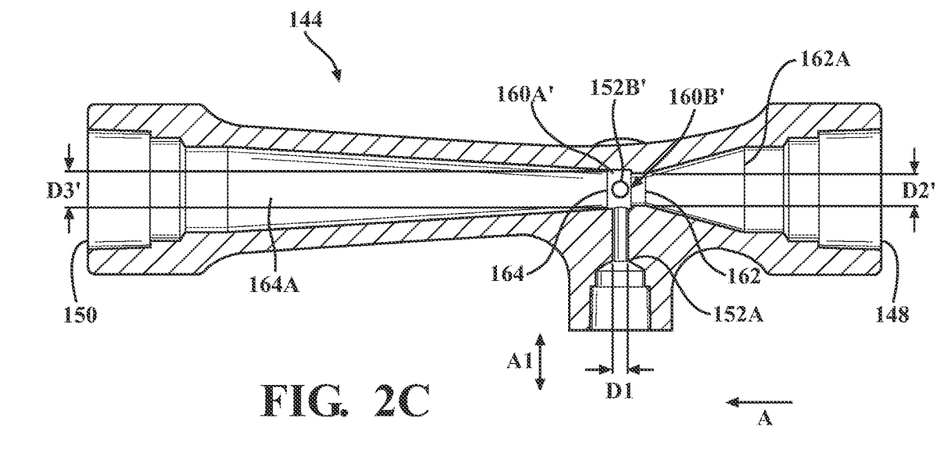
FIG. 2C schematically depicts a partial cross-sectional view of the dual orifice venturi valve of the dual orifice venturi vacuum drawback assembly taken along the lines C-C of FIG. 2B, according to one or more embodiments shown and described herein.

Referring to FIGS. 2A, 2B, and 2C, the dual orifice venturi valve 144 includes a first constricted portion 160A and a second constricted portion 160B. The first constricted portion 160A includes an inlet orifice 162 and an outlet orifice 164. The primary orifice 152A and the secondary orifice 152B are positioned at the first constricted portion 160A between the inlet orifice 162 and the outlet orifice 164. The inlet orifice 162 is the junction of the first constricted portion 160A and the second constricted portion 160B. As such, the inlet orifice 162 is the opening of the first constricted portion 160A that is in communication with the second constricted portion 160B. The second constricted portion 160B is in communication with the venturi inlet 148. The outlet orifice 164 is the opening of the first constricted portion 160A that is in communication with the venturi outlet 150.

In some embodiments, the dual orifice venturi valve 144 includes an inlet passage 162A and an outlet passage 164A. The inlet passage 162A extends between the second constricted portion 160B and the venturi inlet 148. The outlet passage 164A extends between the outlet orifice 164 and the venturi outlet 150.

Referring to FIG. 2B, the primary orifice 152A includes a diameter D1 at the first constricted portion 160A. Referring to FIG. 2C, the secondary orifice 152B includes a diameter D4 at the first constricted portion 160A. Referring to FIGS. 2B, and 2C, the inlet orifice 162 includes a diameter D2 at the first constricted portion 160A. The outlet orifice 164 includes a diameter D3 that is greater than the inlet diameter D2. As such, the inlet orifice 162 is the junction of the first constricted portion 160A and the second constricted portion 160B where the diameter D2 changes from to the diameter D3. The inlet orifice 162 is the opening of the first constricted portion 160A that is in communication with the second constricted portion 160B. The second constricted portion 160B is in communication with the venturi inlet 148. The outlet orifice 164 is the opening of the first constricted portion 160A that is in communication with the venturi outlet 150.

In some embodiments, the dual orifice venturi valve 144 includes an inlet passage 162A and an outlet passage 164A. The inlet passage 162A extends between second constricted portion 160B and the venturi inlet 148. The outlet passage 164A extends between the outlet orifice 164 and the venturi outlet 150.

In some embodiments, the diameter D3 of the outlet orifice 164, the diameter D1 of the primary orifice 152A, the diameter D4' of the secondary orifice 152B, and the diameter D2 of the inlet orifice 162 are dimensioned such that an area of outlet orifice 164 is equal to a sum of an area of the primary orifice 152A, the secondary orifice 152B, and an area of the inlet orifice 162.

In some embodiments, the diameter D3 of the outlet orifice 164, the diameter D1 of the primary orifice 152A, the diameter D4 of the secondary orifice 152B, and the diameter D2 of the inlet orifice 162 are dimensioned such that the area of outlet orifice 164 is less than the sum of the area of the primary orifice 152A, the secondary orifice 152B, and the area of the inlet orifice 162. For example, the area of the outlet orifice 164 is less than the sum of the area of the primary orifice 152A, the area of the secondary orifice 152B, and the area of the inlet orifice 162 by at least 0.1%, such as at least 1%, such as at least 5%, such as at least 10%.

As such, a velocity of the fluid flowing through the inlet orifice 162 is substantially equal to a velocity of the fluid flowing through the primary orifice 152A and the velocity of the fluid flowing through the secondary orifice 152B which is substantially equal to a velocity of the fluid flowing through the outlet orifice 164.

In some embodiments, the first constricted portion 160A is generally cylindrically shaped having the diameter D3, and the second constricted portion 160B is generally cylindrically shaped having the diameter D2. As such, the inlet orifice 162, at the junction between the first constricted portion 160A and the second constricted portion 160B, has the diameter D2' and the outlet orifice 164 has the diameter D3.

In some embodiments, the first constricted portion 160A and the second constricted portion constrict the diameter of the dual orifice venturi valve 144 so as to reduce a pressure which creates a vacuum at the primary orifice 152A and the secondary orifice 152B. In some embodiments, the first constricted portion 160A and the second constricted portion 160B are dimensioned such that an area of the outlet orifice 164 is equal to or less than a sum of an area of the primary orifice 152A, an area of the secondary orifice 152B, and an area of the inlet orifice 162.

Referring to FIGS. 2A, 2B, and 2C, fluid flows through the dual orifice venturi valve 144 in a flow direction A from the venturi inlet 148 towards the venturi outlet 150. In some embodiments, the dual orifice venturi valve 144 is oriented such fluid flows through the primary orifice 152A in a first direction A1 and fluid flows through the secondary orifice 152B in a second direction A2. The first direction A1 is generally perpendicular to the flow direction A and the second direction A2 is generally perpendicular to the flow direction A. The first direction A1 is also generally perpendicular to the second direction A2.

In order to facilitate a better understanding of the dual orifice venturi vacuum drawback assembly 10, a discussion of the operation of the dual orifice venturi vacuum drawback assembly 10 will be provided in reference to FIG. 1. During normal operation, in which the processor 72 determines the absence of a leak or the absence of a maintenance request, the coolant delivery system 1 operates to deliver fluid from the fluid supply 30 to the device 12 through the fluid supply passage 22, the primary fluid supply branch 25 and the secondary fluid supply branch 26, and returns the fluid from the device 12 through the primary fluid return branch 32, the secondary fluid return branch 33, and the fluid return passage 24 to the recirculation device connected to the fluid return 34. Specifically, during normal operation, the shutoff valve 28 is in the normally open position, the bypass valve 42 is in the normally closed position, the air breather check valve 58 is in the normally closed position, and the primary conduit valve 80A and the secondary conduit valve 80B are in the normally closed position.

As fluid flows through the fluid supply passage 22, the fluid is prevented from flowing through the bypass passage 36 as the bypass valve 42 is in the normally closed position. Specifically, fluid is prevented from exiting the bypass passage 36 into the fluid return passage 24 through the bypass outlet 40. Further, fluid is prevented from passing through the primary conduit 46A by the check valve 45A and the primary conduit valve 80A and fluid is prevent from passing through the secondary conduit 46B by the check valve 45B and the secondary conduit valve 80B. Similarly, as fluid flows through the primary fluid supply branch 25, the fluid maintains the air breather check valve 58 in the normally closed position to prevent the fluid from flowing through the air breather check valve 58 into the atmosphere and prevents air from atmosphere from entering into the primary fluid supply branch 25.

During stop operation in which the processor 72 determines the presence of a leak or the processor 72 determines a presence of a maintenance request, the dual orifice venturi vacuum drawback assembly 10 operates to control the flow of fluid from the device 12. Specifically, upon the processor 72 determining the presence of a maintenance request or determining the presence of a leak based on the one or more signals output from the supply flowmeter 20A and the return flowmeter 20B and detected by the detection logic 74A, the control logic 74B is executed by the processor 72 to control the shutoff valve 28 from the normally open position to the closed position, to control the bypass valve 42 from the normally closed position to the open position, and to control the primary conduit valve 80A and the secondary conduit valve 80B from the normally closed position to the open position.

In some embodiments, the processor 72 executes the control logic 74B to switch the bypass valve 42 from the normally closed position to the open position simultaneously with the switching of the shutoff valve 28 from the normally open position to the closed position. In some embodiments, the processor 72 executes the control logic 74B to switch the bypass valve 42 from the normally closed position to the open position after an elapse of a preset time period after switching of the shutoff valve 28 from the normally open position to the closed position.

In the closed position, the shutoff valve 28 prevents fluid from flowing from the fluid supply 30 through the shutoff valve 28 to the device 12. As fluid is prevented from flowing in the fluid supply passage 22, downstream of the shutoff valve 28, additional fluid is prevented from being discharged through the leak or an opening in the system due to maintenance, such as replacement of the upper weld tip 18 and the lower weld tip 18'. As the bypass valve 42 is in the open position, fluid is permitted to flow through the bypass passage 36 from the bypass inlet 38 on the fluid supply passage 22 upstream of the shutoff valve 28 to the bypass outlet 40 on the fluid return passage 24 downstream of the return outlet 23.

As such, fluid flows through the bypass passage 36 including the dual orifice venturi valve 144. Due to the venturi effect of the dual orifice venturi valve 144, a pressure in the dual orifice venturi valve 144 upstream of the primary orifice 152A and the secondary orifice 152B is higher than the pressure downstream of the primary orifice 152A due to the change in cross-sectional area at the first constricted portion 160A and the second constricted portion 160B. Accordingly, the fluid remaining in the fluid supply passage 22 downstream of the shutoff valve 28, the fluid remaining in the primary fluid supply branch 25, the primary device 14, and the primary fluid return branch 32 is at a higher pressure than the pressure at the primary orifice 152A and the fluid moves from the area of high pressure to the area of low pressure to drain the fluid that remains in the fluid supply passage 22 downstream of the shutoff valve 28, the fluid remaining in the primary fluid supply branch 25, the primary device 14, and the primary fluid return branch 32 through the dual orifice venturi valve 144 so as to exit through the bypass outlet 40 of the bypass passage 36 into the fluid return passage 24.

Similarly, the fluid remaining in the fluid supply passage 22 downstream of the shutoff valve 28, the fluid remaining in the primary fluid supply branch 25, the primary device 14, and the primary fluid return branch 32 is at a higher pressure than the pressure at the secondary orifice 152B and the fluid moves from the area of high pressure to the area of low pressure to drain fluid that remains in the fluid supply passage 22 downstream of the shutoff valve 28, the fluid remaining in the primary fluid supply branch 25, the primary device 14, and the primary fluid return branch 32 through the dual orifice venturi valve 144 so as to exit through the bypass outlet 40 of the bypass passage 36 into the fluid return passage 24.

As such, the decrease in pressure creates a vacuum at the primary orifice 152A allowing the fluid that remains in the fluid supply passage 22 downstream of the shutoff valve 28, the fluid remaining in the primary fluid supply branch 25, the primary device 14, and the primary fluid return branch 32 to be drawn through primary drawback opening 54A and into the primary orifice 152A via the primary conduit 46A. The vacuum or the fluid flowing from the primary drawback opening 54A through the primary conduit 46A towards the primary orifice 152A opens the check valve 45A. Fluid drawn through the primary orifice 152A exits the dual orifice venturi valve 144 via the venturi outlet 150 and enters the fluid return passage 24 via the bypass outlet 40. Therefore, the fluid that remains in the fluid supply passage 22 downstream of the shutoff valve 28, the primary fluid supply branch 25, the primary device 14, and the primary fluid return branch 32 will not discharge through the leak due to the vacuum effect of the dual orifice venturi valve 144.

Similarly, the decrease in pressure creates a vacuum at the secondary orifice 152B allowing the fluid that remains in the fluid supply passage 22 downstream of the shutoff valve 28, the primary fluid supply branch 25, the primary device 14, and the primary fluid return branch 32 to be drawn through secondary drawback opening 54B and into the secondary orifice 152B via the secondary conduit 46B. The vacuum or the fluid flowing from the secondary drawback opening 54B through the secondary conduit 46B towards the secondary orifice 152B opens the check valve 45B. Fluid drawn through the secondary orifice 152B exits the dual orifice venturi valve 144 via the venturi outlet 150 and enters the fluid return passage 24 via the bypass outlet 40. Therefore, the fluid that remains in the fluid supply passage 22 downstream of the shutoff valve 28, the primary fluid supply branch 25, the primary device 14, and the primary fluid return branch 32 will not discharge through the leak due to the vacuum effect of the dual orifice venturi valve 144.

Further, upon the draining of the fluid that remains in the primary fluid supply branch 25 through the primary device 14, the air breather check valve 58 will move from the normally closed position to the open position due to the loss of fluid pressure acting on the air breather check valve 58 and/or the vacuum created at the primary orifice 152A and the secondary orifice 152B. Upon movement of the air breather check valve 58 from the normally closed position to the open position, air from atmosphere enters the primary fluid supply branch 25 through the air breather check valve 58. The ingress of air from atmosphere entering the primary fluid supply branch 25 through the air breather check valve 58 facilitates the draining of the fluid that remains in the primary device 14 and the primary fluid return branch 32 through the dual orifice venturi valve 144. In some embodiments, the electronic control unit 70 electronically controls the air breather check valve 58 to open at a predetermined time, such as simultaneously with the opening of the bypass valve 42 and the closing of the shutoff valve 28 or after a elapse of a predetermined time after the opening of the bypass valve 42 and/or the closing of the shutoff valve 28.

Upon detection of the leak by the flowmeter unit 20 or the determination of the maintenance request, and the movement of the shutoff valve 28 from the normally opened position to the closed position, the bypass valve 42 from the normally closed position to the open position, and the primary conduit valve 80A and the secondary conduit valve 80B from the normally closed position to the open position, and the air breather check valve 58 from the normally closed position to the open position, the fluid remaining in the upper weld tip fluid supply passage 18A flows to upper weld tip fluid return passage 18B and into the primary fluid return branch 32 through the junction 14C as air has entered the primary fluid supply branch 25 through the air breather check valve 58. Similarly, the fluid remaining in the lower weld tip fluid supply passage 18A' flows to lower weld tip fluid return passage 18B' and into the primary fluid return branch 32 through the junction 14C as air has entered the primary fluid supply branch 25 through the air breather check valve 58.

It is appreciated, that the introduction of air from atmosphere into the primary fluid supply branch 25, upon movement of the air breather check valve 58 from the normally closed position to the open position, facilitates the draining of the fluid remaining in the primary fluid supply branch 25, the primary device 14, and the primary fluid return branch 32 through the dual orifice venturi valve 144 due to the air pushing the remaining fluid towards the primary orifice 152A and the secondary orifice 152B. Specifically, as the vacuum created at the primary orifice 152A and the secondary orifice 152B drains the remaining fluid, the air pushes the remaining fluid towards the dual orifice venturi valve 144.

It is appreciated that in some embodiments, the primary drawback opening 54A and the secondary drawback opening 54B are provided on the primary fluid return branch 32, such that fluid will remain in the secondary fluid supply branch 26, the secondary device 16, and the secondary fluid return branch 33 so as to continue cooling of the secondary device 16 upon the movement of the shutoff valve 28 from the normally open position to the closed position and the movement of the bypass valve 42 from the normally closed position to the open position.

It is appreciated that in some embodiments, the air breather check valve 58 is positioned adjacent the primary device inlet 14A. In some other embodiments, the air breather check valve 58 is positioned on the primary fluid supply branch 25 immediately upstream of the primary device inlet 14A. Specifically, the air breather check valve 58 is positioned on the primary fluid supply branch 25 between the fluid supply branch portion 22A and the primary device inlet 14A the maximum distance away from the fluid supply branch portion 22A. In some other embodiments, the air breather check valve 58 is formed as part of the primary device inlet 14A.

In some other embodiments, the secondary drawback opening 54B is provided on the secondary fluid return branch 33 such that upon detection of a leak, the fluid remaining in the in the secondary fluid supply branch 26, the secondary device 16, and the secondary fluid return branch 33 will drain through the secondary drawback opening 54B and the secondary conduit 46B due to the vacuum created at the secondary orifice 152B.

It is appreciated that in some embodiments, the secondary drawback opening 54B is provided on the secondary fluid return branch 33 such that fluid in the secondary device 16 is drawn through the secondary drawback opening 54B, the secondary orifice 152B and exits the bypass passage 36 into the fluid return passage 24 through the bypass outlet 40.

Figure 3:
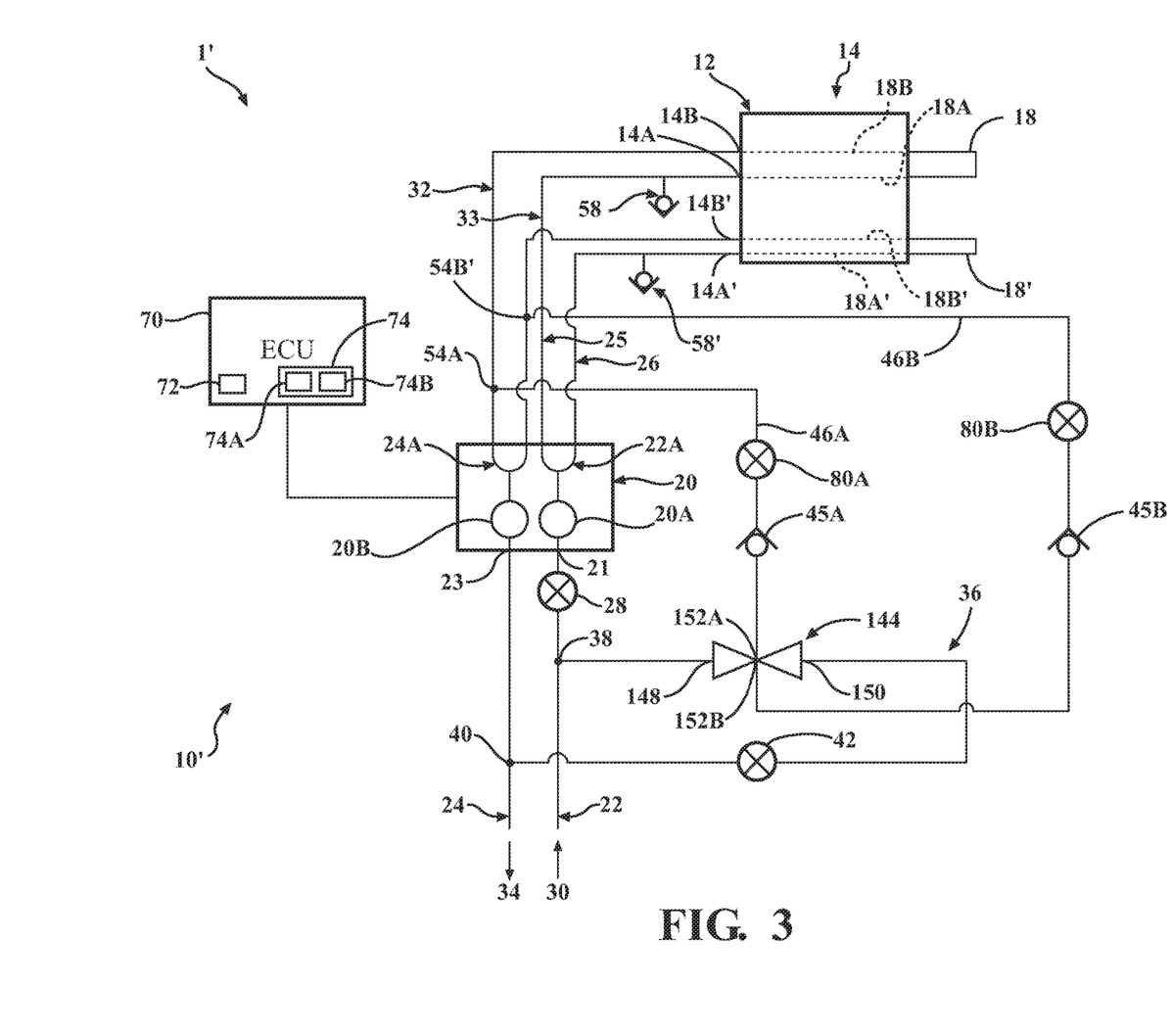
FIG. 3 schematically depicts a dual orifice venturi vacuum drawback assembly for controlling a flow of a fluid from a primary device and a secondary device, according to one or more embodiments shown and described herein.

Referring to FIG. 3, a cooling delivery system is generally illustrated at 1'. The cooling system 1' includes a dual orifice venturi vacuum drawback assembly 10'. The dual orifice venturi vacuum drawback assembly 10' is similar to the dual orifice venturi vacuum drawback assembly 10 except that the dual orifice venturi vacuum drawback assembly 10' omits the secondary device 16 and the secondary drawback opening 54B, and that the dual orifice venturi vacuum drawback assembly 10' includes a secondary drawback opening 54B' provided on the secondary fluid return branch 33, and a secondary air breather check valve 58' provided on the secondary fluid supply branch 26 downstream of the shutoff valve 28.

Specifically, the primary fluid supply branch 25 connects to the primary device inlet 14A, the secondary fluid supply branch 26 connects to a primary device inlet 14A', the primary fluid return branch 32 connects to the primary device outlet 14B, and the secondary fluid return branch 33 connects to a primary device outlet 14B.

In some embodiments, the upper weld tip 18 is connected to the primary device inlet 14A by the upper weld tip fluid supply passage 18A, and the upper weld tip 18 is connected to the primary device outlet 14B by the upper weld tip fluid return passage 18B. In some embodiments, the lower weld tip 18' is connected to the primary device inlet 14A' by the lower weld tip fluid supply passage 18A', and the lower weld tip 18' is connected to the primary device outlet 14B' by the lower weld tip fluid return passage 18B'.

As the secondary drawback opening 54B' is provided on the secondary fluid return branch 33, fluid in secondary fluid supply branch 26, downstream of the shutoff valve 28, the device 12, specifically, the lower weld tip fluid supply passage 18A' and the lower weld tip fluid return passage 18B', and the secondary fluid return branch 33 may be drained through the secondary drawback opening 54B', the secondary conduit 46B, the secondary orifice 152B, and exit through the bypass outlet 40 into the fluid return passage 24.

The secondary air breather check valve 58' is provided on the secondary fluid supply branch 26 between the primary device inlet 14A' and the fluid supply branch portion 22A. The secondary air breather check valve 58' has one end attached to the secondary fluid supply branch 26 and an opposite end open to atmosphere. As the secondary air breather check valve 58' operates in a similar manner as the air breather check valve 58.

In normal operation, the dual orifice venturi vacuum drawback assembly 10' operates in a similar manner as the dual orifice venturi vacuum drawback assembly 10, except that fluid flows through the secondary fluid supply branch 26 into the primary device inlet 14A', through the lower weld tip fluid supply passage 18A', the lower weld tip 18', the lower weld tip fluid return passage 18B' to exit the primary device outlet 14B' into the secondary fluid return branch 33.

During stop operation, the dual orifice venturi vacuum drawback assembly 10' operates in a similar manner as the dual orifice venturi vacuum drawback assembly 10, except that as the fluid flows through the bypass passage 36, the fluid remaining in the secondary fluid supply branch 26, the primary device 14, including the lower weld tip fluid supply passage 18A' and the lower weld tip fluid return passage 18B', and the secondary fluid return branch 33 is at a higher pressure than the pressure at the secondary orifice 152B and the fluid moves from the area of high pressure to the area of low pressure to drain fluid that remains in the secondary fluid supply branch 26, the primary device 14, including the lower weld tip fluid supply passage 18A' and the lower weld tip fluid return passage 18B', and the secondary fluid return branch 33 through the secondary orifice 152B of the dual orifice venturi valve 144 so as to exit through the bypass outlet 40 of the bypass passage 36 into the fluid return passage 24.

As such, the decrease in pressure creates a vacuum at the secondary orifice 152B allowing the fluid that remains in the secondary fluid supply branch 26, the primary device 14, and the secondary fluid return branch 33 to be drawn through secondary drawback opening 54B' and into the secondary orifice 152B via the secondary conduit 46B. The fluid flowing from the secondary drawback opening 54B through the secondary conduit 46B towards the secondary orifice 152B opens the check valve 45B. Fluid drawn through the secondary orifice 152B exits the dual orifice venturi valve 144 via the venturi outlet 150 and enters the fluid return passage 24 via the bypass outlet 40. Therefore, the fluid that remains in the secondary fluid supply branch 26, the primary device 14, and the secondary fluid return branch 33 will not discharge through the leak due to the vacuum effect of the dual orifice venturi valve 144.

Further, upon the draining of the fluid that remains in the secondary fluid supply branch 26 through the primary device 14, the secondary air breather check valve 58' will move from the normally closed position to the open position due to the loss of fluid pressure acting on the secondary air breather check valve 58' and the vacuum created at the secondary orifice 152B. Upon movement of the secondary air breather check valve 58' from the normally closed position to the open position, air from atmosphere enters the secondary fluid supply branch 26 through the secondary air breather check valve 58'. The ingress of air from atmosphere entering the secondary fluid supply branch 26' through the secondary air breather check valve 58' facilitates the draining of the fluid that remains in the secondary fluid supply branch 26, the primary device 14, and the secondary fluid return branch 33 through the dual orifice venturi valve 144.

In some embodiments, the electronic control unit 70 is configured to individually control the primary conduit valve 80A and the secondary conduit valve 80B from the normally closed position to the open position. As such, the electronic control unit 70 may move only one of the primary conduit valve 80A and the secondary conduit valve 80B from the normally closed position to the open position and retain the other of the primary conduit valve 80A and the secondary conduit valve 80B in the normally closed position to allow maintenance on one of the upper weld tip 18 and the lower weld tip 18' while providing cooling to the other of the upper weld tip 18 and the lower weld tip 18'.

It is appreciated, that in some embodiments, the secondary drawback opening 54B' may be provided on the primary fluid supply branch 32.

Figure 4:
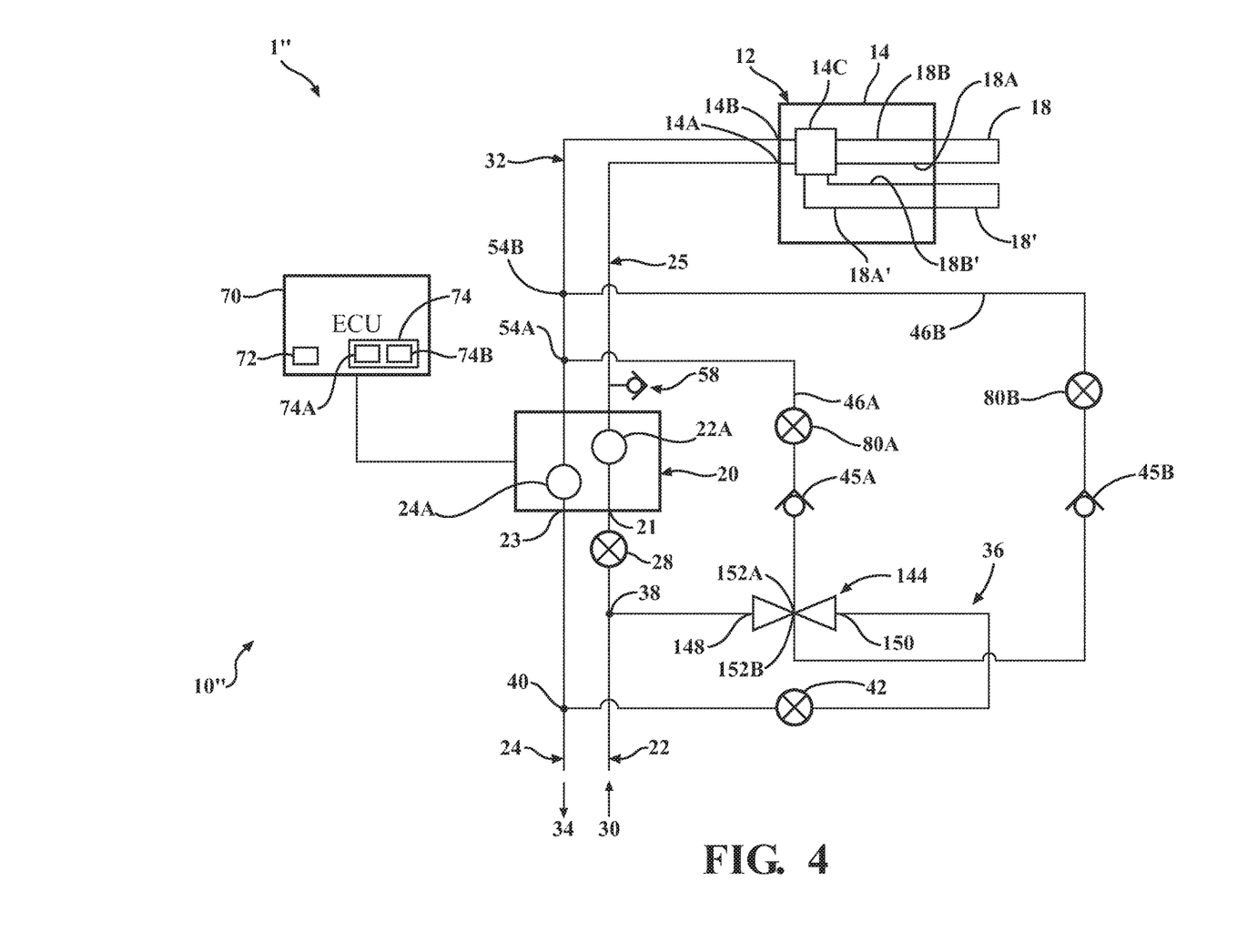
FIG. 4 schematically depicts a partial cross section view of a venturi valve of a venturi vacuum drawback assembly, according to one or more embodiments shown and described herein.

Referring to FIG. 4, a cooling delivery system is generally illustrated at 1". The cooling system 1' includes a dual orifice venturi vacuum drawback assembly 10". The dual orifice venturi vacuum drawback assembly 10" is similar to the dual orifice venturi vacuum drawback assembly 10 except that the dual orifice venturi vacuum drawback assembly 10' omits the secondary fluid supply branch 26, the secondary fluid return branch 33, fluid supply branch portion 22A, and the fluid return branch portion 24A. As the dual orifice venturi vacuum drawback assembly 10' is only provided with a primary fluid supply branch 25 connected to the fluid supply passage 22 and a primary fluid return branch 32 connected to the fluid return passage 24, the air breather check valve 58 is provided on the primary fluid supply branch 25 downstream and adjacent the flowmeter unit 20.

It is appreciated, that the positioning of the air breather check valve 58 in proximity to the flowmeter unit 20 allows for an increase in the amount of fluid remaining in the primary fluid supply branch 25 that can be pushed towards the dual orifice venturi valve 144 by the air that enters the primary fluid supply branch 25 through the air breather check valve 58.

In some other embodiments, the air breather check valve 58 is positioned immediately downstream of the flowmeter unit 20 on the primary fluid supply branch 25. Specifically, the air breather check valve 58 is positioned on the primary fluid supply branch 25 between the flowmeter unit 20 and the primary device inlet 14A a maximum distance away from the primary device inlet 14A.

As the dual orifice venturi vacuum drawback assembly 10" operates in a substantially similar manner as the dual orifice venturi vacuum drawback assembly 10, a discussion of the operation of the dual orifice venturi vacuum drawback assembly 10' will not be repeated.

It is appreciated that in some embodiments, the dual orifice venturi vacuum drawback assembly 10 and the dual orifice venturi vacuum drawback assembly 10' includes a single orifice venturi valve that includes only the primary orifice 152A. In such an embodiment, the secondary orifice, the secondary conduit, the secondary check valve, the secondary conduit valve, the secondary drawback opening, and the secondary air breather check valve are omitted, and the primary orifice 152A is connected to the primary drawback opening 54A by the primary conduit 46A.

It is appreciated that in some other embodiments, the dual orifice venturi vacuum drawback assembly 10, dual orifice venturi vacuum drawback assembly 10', and the dual orifice venturi vacuum drawback assembly 10" includes a multiple orifice venturi valve that includes a primary orifice, a secondary orifice, and at least one auxiliary orifice such as one, two or more auxiliary orifices. In such an embodiment, the dual orifice venturi vacuum drawback assembly 10, the dual orifice venturi vacuum drawback assembly 10', the dual orifice venturi vacuum drawback assembly 10", further includes an auxiliary conduit, an auxiliary drawback opening, an auxiliary check valve and an auxiliary conduit valve positioned on the auxiliary conduit between the auxiliary orifice and the auxiliary drawback opening. In some embodiments, the auxiliary drawback opening is formed on the primary fluid return branch, and in some other embodiments, the auxiliary drawback opening is formed in one of primary fluid supply branch, the secondary fluid supply branch, or the secondary fluid return branch.

It is further appreciated that in some other embodiments, the dual orifice venturi vacuum drawback assembly 10, the dual orifice venturi vacuum drawback assembly 10', the dual orifice venturi vacuum drawback assembly 10" includes one or more, such as two, three, four, or more auxiliary orifices, auxiliary conduits, auxiliary drawback openings, auxiliary check valves and auxiliary conduit valves positioned on the one or more auxiliary conduits between the auxiliary orifices and the auxiliary drawback openings.

It is appreciated that the auxiliary orifice includes a diameter D5, and that the diameter D3' of the outlet orifice, the diameter D1' of the primary orifice, the diameter D4' of the secondary orifice, and the diameter D2' of the inlet orifice are dimensioned such that an area of outlet orifice is equal to a sum of an area of the primary orifice, the secondary orifice, the auxiliary orifice and an area of the inlet orifice. In some embodiments, the diameter D3' of the outlet orifice, the diameter D1' of the primary orifice, the diameter D4' of the secondary orifice, the diameter D2' of the inlet orifice, and the diameter D5 of the auxiliary orifice are dimensioned such that the area of outlet orifice is less than the sum of the area of the primary orifice, the secondary orifice, the auxiliary orifice, and the area of the inlet orifice. For example, the area of the outlet orifice is less than the sum of the area of the primary orifice, the area of the secondary orifice, the auxiliary orifice, and the area of the inlet orifice by at least 0.1%, such as at least 1%, such as at least 5%, such as at least 10%.

In addition, the dual orifice venturi vacuum drawback assembly 10, the dual orifice venturi vacuum drawback assembly 10', and the dual orifice venturi vacuum drawback assembly 10" are optionally used to remove fluid remaining in the fluid supply passage 22 downstream of the shutoff valve 28, the primary fluid supply branch 25, the primary device 14, and the primary fluid return branch 32, when the shutoff valve 28 are in the closed position to shut off the supply of fluid to the device 12 during maintenance of the device 12. For example, when replacing the upper weld tip 18 and the lower weld tip 18', the shutoff valve 28 is in the closed position to shut off the flow of fluid to the device 12 and the bypass valve 42 is in the open position to drain the remaining fluid to inhibit the remaining fluid from discharging during replacement of the upper weld tip 18 and the lower weld tip 18'.

However, the use of the dual orifice venturi vacuum drawback assembly 10, the dual orifice venturi vacuum drawback assembly 10', and the dual orifice venturi vacuum drawback assembly 10" are not limited thereto. It is appreciated, of course, that the dual orifice venturi vacuum drawback assembly 10, the dual orifice venturi vacuum drawback assembly 10', and the dual orifice venturi vacuum drawback assembly 10" are applicable in various other types of recirculating and non-recirculating coolant systems illustratively including internal combustion engines, lasers, battery systems, computer system, and other electronic or mechanical components that requires cooling. Moreover, the dual orifice venturi vacuum drawback assembly 10, the dual orifice venturi vacuum drawback assembly 10', and the dual orifice venturi vacuum drawback assembly 10" are applicable in various other environments illustratively including, but not limited to, fluid transfer systems used in manufacturing or agriculture. In such fluid transfer systems, the dual orifice venturi vacuum drawback assembly 10, the dual orifice venturi vacuum drawback assembly 10', and the dual orifice venturi vacuum drawback assembly 10" are utilized to direct the flow of fluid through the venturi effect caused by a single orifice venturi valve and the dual orifice venturi valve 144, respectively.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. It is therefore intended that the appended claims cover all such changes and modifications that are within the scope of the embodiments shown and described herein.

It is claimed:

1. A dual orifice venturi vacuum drawback assembly for controlling a flow of a fluid from a device, the dual orifice venturi vacuum drawback assembly comprising:
   a fluid supply passage that supplies the fluid to the device;
   a fluid return passage that returns the fluid from the device;
   a shutoff valve positioned on the fluid supply passage;
   a bypass passage includes an inlet and an outlet, the inlet connected to the fluid supply passage upstream of the shutoff valve, and the outlet connected to the fluid return passage;
   a bypass valve positioned on the bypass passage; and
   a dual orifice venturi valve positioned on the bypass passage upstream of the bypass valve, the dual orifice venturi valve includes a venturi inlet, a venturi outlet, a primary orifice, and a secondary orifice, the primary orifice is connected to a primary drawback opening on the fluid return passage by a primary conduit, the secondary orifice is connected to a secondary drawback opening on the fluid return passage by a secondary conduit.

2. The dual orifice venturi vacuum drawback assembly of claim 1, wherein the dual orifice venturi valve includes a constricted portion at which the primary orifice and the secondary orifice are located, the venturi inlet has an inlet orifice at the constricted portion, the venturi outlet has an outlet orifice at the constricted portion, wherein an area of the outlet orifice is equal to or less than a sum of an area of the primary orifice, an area of the secondary orifice, and an area of the inlet orifice.

3. The dual orifice venturi vacuum drawback assembly of claim 2, further comprising:
   an air breather check valve positioned on the fluid supply passage downstream of the shutoff valve, the air breather check valve is moveable between a normally closed position and an open position, in the normally closed position air is inhibited from flowing through the air breather check valve into the fluid supply passage, and in the open position air is permitted from flowing through the air breather check valve into the fluid supply passage.

4. The dual orifice venturi vacuum drawback assembly of claim 3, wherein the shutoff valve is switchable between a normally open position and a closed position, in the normally open position fluid is permitted to flow through the shutoff valve to the device, and in the closed position fluid is inhibited from flowing through the shutoff valve,
   wherein the bypass valve is movable between a normally closed position and an open position, in the normally closed position fluid flowing from the fluid supply passage is inhibited from flowing through the bypass valve to the fluid return passage, in the open position fluid flowing from the fluid supply passage is permitted to flow through the bypass valve to the fluid return passage.

5. The dual orifice venturi vacuum drawback assembly of claim 4, wherein upon movement of the shutoff valve from the normally open position to the closed position, and movement of the bypass valve from the normally closed position to the open position, fluid flowing from the fluid supply passage passes through the bypass passage to create a vacuum at the primary orifice of the dual orifice venturi valve that draws fluid remaining in the fluid return passage downstream of the device through the primary drawback opening in the fluid return passage and the primary conduit such that the fluid exits the venturi outlet into the fluid return passage through the outlet of the bypass passage, and fluid flowing from the fluid supply passage passes through the bypass passage to create a vacuum at the secondary orifice of the dual orifice venturi valve that draws fluid remaining in the fluid return passage downstream of the device through the secondary drawback opening in the fluid return passage and the secondary conduit such that the fluid exits the venturi outlet into the fluid return passage through the outlet of the bypass passage.

6. The dual orifice venturi vacuum drawback assembly of claim 5, wherein upon movement of the shutoff valve from the normally open position to the closed position, fluid is inhibited from flowing through the shutoff valve which moves the air breather check valve from the normally closed position to the open position to permit air from atmosphere to enter the fluid supply passage to facilitate the drawback of fluid in the fluid return passage, the device, and the fluid return passage.

7. The dual orifice venturi vacuum drawback assembly of claim 6 further comprising:
a flowmeter unit configured to control the shutoff valve and the bypass valve, the flowmeter unit is positioned on at least one of the fluid supply passage and the fluid return passage, the flowmeter unit configured to detect a leak in at least one of the fluid supply passage and the fluid return passage,
wherein upon detection of a leak by the flowmeter unit the flowmeter unit controls the shutoff valve from the normally open position to the closed positon to inhibit the flow of fluid to the device and the flowmeter unit controls the bypass valve from the normally closed position to the open position.

8. A dual orifice venturi vacuum drawback assembly for controlling a flow of a fluid from a primary device and a secondary device, the dual orifice venturi vacuum drawback assembly comprising:
a fluid supply passage that connects to a primary fluid supply branch and a secondary fluid supply branch, the primary fluid supply branch supplies fluid from the supply passage to the primary device, the secondary fluid supply branch supplies fluid from the fluid supply passage to the secondary device;
a fluid return passage that connects to a primary fluid return branch and a secondary fluid return branch, the primary fluid return branch returns fluid from the primary device to the fluid return passage, and the secondary fluid return branch returns fluid from the secondary device to the fluid return passage;
a shutoff valve positioned on the fluid supply passage upstream of the primary fluid supply branch and the secondary fluid supply branch;
a bypass passage includes an inlet and an outlet, the inlet connected to the fluid supply passage upstream of the shutoff valve, and the outlet connected to the fluid return passage downstream of the primary fluid return branch and the secondary fluid return branch;
a bypass valve positioned on the bypass passage; and
a dual orifice venturi valve positioned on the bypass passage upstream of the bypass valve, the dual orifice venturi valve includes a venturi inlet, a venturi outlet, a primary orifice, and a secondary orifice, the primary orifice is connected to a primary drawback opening on the primary fluid return branch by a primary conduit, the secondary orifice is connected to a secondary drawback opening on the primary fluid return branch by a secondary conduit.

9. The dual orifice venturi vacuum drawback assembly of claim 8, wherein the dual orifice venturi valve includes a constricted portion at which the primary orifice and the secondary orifice are located, the venturi inlet has an inlet orifice at the constricted portion, the venturi outlet has an outlet orifice at the constricted portion, wherein an area of the outlet orifice is equal to or less than a sum of an area of the primary orifice, an area of the secondary orifice, and an area of the inlet orifice.

10. The dual orifice venturi vacuum drawback assembly of claim 9, further comprising:
an air breather check valve positioned on the primary fluid supply branch downstream of the shutoff valve, the air breather check valve is moveable between a normally closed position and an open position, in the normally closed position air is inhibited from flowing through the air breather check valve into the primary fluid supply branch, and in the open position air is permitted from flowing through the air breather check valve into the primary fluid supply branch.

11. The dual orifice venturi vacuum drawback assembly of claim 10, wherein the shutoff valve is switchable between a normally open position and a closed position, in the normally open position fluid is permitted to flow through the shutoff valve to the primary device through the primary fluid supply branch and to the secondary device through the secondary fluid supply branch, and in the closed position fluid is inhibited from flowing through the shutoff valve,
wherein the bypass valve is movable between a normally closed position and an open position, in the normally closed position fluid flowing from the fluid supply passage is inhibited from flowing through the bypass valve to the fluid return passage, in the open position fluid flowing from the fluid supply passage is permitted to flow through the bypass valve to the fluid return passage.

12. The dual orifice venturi vacuum drawback assembly of claim 11, wherein upon movement of the shutoff valve from the normally open position to the normally closed position, and movement of the bypass valve from the normally closed position to the open position, fluid flowing from the fluid supply passage passes through the bypass passage to create a vacuum at the primary orifice of the dual orifice venturi valve that draws fluid remaining in the primary fluid return branch downstream of the primary device through the primary drawback opening in the primary fluid return branch and the primary conduit such that the fluid exits the venturi outlet into the fluid return passage through the outlet of the bypass passage, and fluid flowing from the fluid supply passage passes through the bypass passage to create a vacuum at the secondary orifice of the dual orifice venturi valve that draws fluid remaining in the primary fluid return branch downstream of the primary device through the secondary drawback opening in the primary fluid return branch and the secondary conduit such that the fluid exits the venturi outlet into the fluid return passage through the outlet of the bypass passage.

13. The dual orifice venturi vacuum drawback assembly of claim 11, wherein upon movement of the shutoff valve from the normally open position to the closed position, fluid is inhibited from flowing through the shutoff valve which moves the air breather check valve from the normally closed position to the open position to permit air from atmosphere to enter the primary fluid supply branch to facilitate the drawback of fluid in the primary fluid return branch, the primary device, and the fluid return passage.

14. The dual orifice venturi vacuum drawback assembly of claim 13 further comprising:
a flowmeter unit configured to control the shutoff valve and the bypass valve, the flowmeter unit is positioned on at least one of the fluid supply passage and the fluid return passage downstream of the primary fluid supply branch, the secondary fluid supply branch, the primary fluid return branch, and the secondary fluid return branch, the flowmeter unit configured to detect a leak in at least one of the primary fluid supply branch, the secondary fluid supply branch, the primary fluid return branch, and the secondary fluid return branch,
wherein upon detection of a leak by the flowmeter unit the flowmeter unit controls the shutoff valve from the normally open position to the closed positon inhibit the flow of fluid to the primary device and the flowmeter unit controls the bypass valve from the normally closed position to the open position.

15. The dual orifice venturi vacuum drawback assembly of claim 14, wherein an air breather check valve is not provided on the secondary fluid supply branch which supplies fluid to the secondary device.

16. A dual orifice venturi vacuum drawback assembly for controlling a flow of a fluid from a primary device and a secondary device, the dual orifice venturi vacuum drawback assembly comprising:
a fluid supply passage that connects to a primary fluid supply branch and a secondary fluid supply branch, the primary fluid supply branch supplies fluid from the fluid supply passage to the fluid to the primary device, the secondary fluid supply branch supplies fluid from the fluid supply passage to the secondary device;
a fluid return passage that connects to a primary fluid return branch and a secondary fluid return branch, the primary fluid return branch returns fluid from the primary device to the fluid return passage, and the secondary fluid return branch returns fluid from the secondary device to the fluid return passage;
a shutoff valve positioned on the fluid supply passage upstream of the primary fluid supply branch and the secondary fluid supply branch;
a bypass passage includes an inlet and an outlet, the inlet connected to the fluid supply passage upstream of the shutoff valve, and the outlet connected to the fluid return passage downstream of the primary fluid return branch and the secondary fluid return branch;
a primary air breather check valve positioned on the primary fluid supply branch downstream of the shutoff valve;
a secondary air breather check valve positioned on the secondary fluid supply branch downstream of the shutoff valve;
a bypass valve positioned on the bypass passage; and
a dual orifice venturi valve positioned on the bypass passage upstream of the bypass valve, the dual orifice venturi valve includes a venturi inlet, a venturi outlet, a primary orifice, and a secondary orifice, the primary orifice is connected to a primary drawback opening on the primary fluid return branch by a primary conduit, the secondary orifice is connected to a secondary drawback opening on the secondary fluid return branch by a secondary conduit.

17. The dual orifice venturi vacuum drawback assembly of claim 16, wherein the dual orifice venturi valve includes a constricted portion at which the primary orifice and the secondary orifice are located, the venturi inlet has an inlet orifice at the constricted portion, the venturi outlet has an outlet orifice at the constricted portion, wherein an area of the outlet orifice is equal to or less than a sum of an area of the primary orifice, an area of the secondary orifice, and an area of the inlet orifice.

18. The dual orifice venturi vacuum drawback assembly of claim 17, wherein the primary air breather check valve is moveable between a normally closed position and an open position, in the normally closed position air is inhibited from flowing through the primary air breather check valve into the primary fluid supply branch, and in the open position air is permitted from flowing through the primary air breather check valve into the primary fluid supply branch,
wherein the secondary air breather check valve is moveable between a normally closed position and an open position, in the normally closed position air is inhibited from flowing through the secondary air breather check valve into the secondary fluid supply branch, and in the open position air is permitted from flowing through the secondary air breather check valve into the secondary fluid supply branch.

19. The dual orifice venturi vacuum drawback assembly of claim 18, wherein the shutoff valve is switchable between a normally open position and a closed position, in the normally open position fluid is permitted to flow through the shutoff valve to the primary device through the primary fluid supply branch and to the secondary device through the secondary fluid supply branch, and in the closed position fluid is inhibited from flowing through the shutoff valve,
wherein the bypass valve is movable between a normally closed position and an open position, in the normally closed position fluid flowing from the fluid supply passage is inhibited from flowing through the bypass valve to the fluid return passage, in the open position fluid flowing from the fluid supply passage is permitted to flow through the bypass valve to the fluid return passage.

20. The dual orifice venturi vacuum drawback assembly of claim 19, wherein upon movement of the shutoff valve from the normally open position to the closed position, fluid is inhibited from flowing through the shutoff valve which moves the primary air breather check valve from the normally closed position to the open position to permit air from atmosphere to enter the primary fluid supply branch to facilitate the drawback of fluid in the primary fluid return branch, the primary device, and the fluid return passage, and
wherein upon movement of the shutoff valve from the normally open position to the closed position, fluid is inhibited from flowing through the shutoff valve which moves the secondary air breather check valve from the normally closed position to the open position to permit air from atmosphere to enter the secondary fluid supply branch to facilitate the drawback of fluid in the secondary fluid return branch, the primary device, and the fluid return passage.

* * * * *